July 15, 1969   F. G. BACK   3,455,628
COMPACT VARIFOCAL LENS SYSTEM
Filed Dec. 15, 1966   3 Sheets-Sheet 1

INVENTOR
FRANZ G. BACK
Albert Kronman
ATTORNEY

July 15, 1969     F. G. BACK     3,455,628

COMPACT VARIFOCAL LENS SYSTEM

Filed Dec. 15, 1966     3 Sheets-Sheet 3

INVENTOR.
FRANK G. BACK
BY Albert F. Kronman
ATTORNEY

United States Patent Office 3,455,628
Patented July 15, 1969

3,455,628
COMPACT VARIFOCAL LENS SYSTEM
Frank G. Back, 55 Sea Cliff Ave.,
Glen Cove, N.Y. 11542
Filed Dec. 15, 1966, Ser. No. 602,095
Int. Cl. G02b 9/64
U.S. Cl. 350—187                        1 Claim

ABSTRACT OF THE DISCLOSURE

A varifocal lens system suitable for use with still cameras in which the variator lens assembly is of a size not substantially larger than the other lenses in the system. Two doublets having cemented interfaces and formed of glass having a substantially equal index of refraction for D light but a different dispersion V number are employed to correct chromatic aberration and permit the use of highly refractive glasses in other lens elements. To correct color aberrations through all the zoom positions one of the buried radii of the cemented doublets is a movable and the other is a stationary lens group. A single control barrel permits both zooming and focusing of the lens system.

BACKGROUND AND SUMMARY OF THE INVENTION

This invention relates to varifocal lens structures and particularly to a varifocal lens for use with still, hand held cameras.

Varifocal lenses employing the principles of optical image shift compensation for still and motion picture photography are now well known. However, such lenses have heretofore been either heavy and bulky or covered a focal length which was not very practical. The limitations on focal length have heretofore been imposed by the fact that the longer the minimum focal length of a varifocal system, the easier it is to correct. In addition, the longer the physical length of the system, the smaller the incidence and vergence angles of the incoming light become, and therefore, fewer difficulties arise in eliminating zonal image defects when the varifocal lens is of substantial size.

In the handling of small cameras, it is important that the varifocal lens have a convenient size relationship with respect to the entire camera and that the available focal length be suited to the needs of the average still camera user. Adjustment of the zoom and focusing of the lens must be conveniently and preferably quickly done.

Accordingly, it is an object of the present invention to provide a varifocal lens for use with still cameras which is relatively compact in overall size.

Another object of the present invention is to provide a varifocal lens which will be easier to operate than previously known lenses of this type.

Still another object of the present invention is to provide a varifocal lens which will have aberrations and color correction comparable to that of standard fixed focus camera lenses.

In its principal aspect the present invention employs positive and negative lens elements of considerable power and two cemented doublets made of glass having substantially equal index of refraction but different dispersion V numbers. The cemented doublets with their buried radii correct aberration and permit the use of highly refractive glass throughout the system so as to greatly reduce the diameter of the lens assembly. In order to effectively correct color through all zoom positions, one of the buried radii is in a movable and one in a stationary lens group.

A single control barrel operates both the zoom and the focus of the lens system.

These and other objects, features and advantages of the present invention will be more clearly understood through a consideration of the following detailed description, and the attached drawings.

DESCRIPTION OF THE PREFERRED EMBODIMENT

Figure 3:
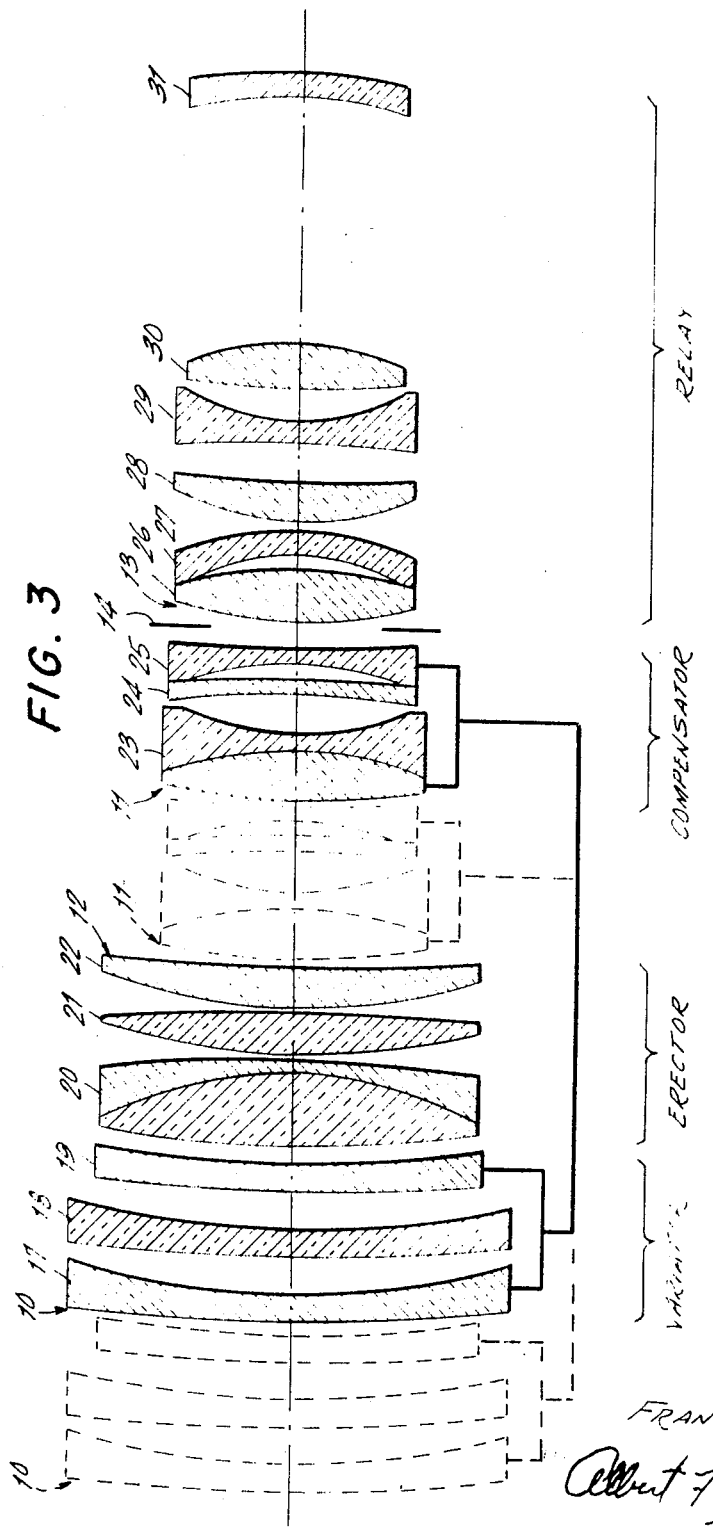
FIGURE 3 is a somewhat diagrammatic view in longitudinal section of the lens system of the varifocal lens assembly shown in FIGURES 1 and 2, somewhat enlarged with the second position of the movable lens groups indicated by dashed lines.
Figure 4:
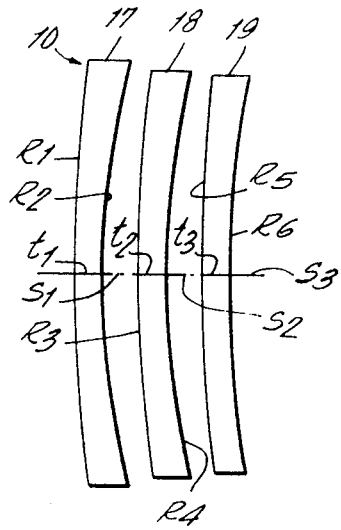
FIGURE 4 is a somewhat diagrammatic view in longitudinal section of the first movable lens group or variator of the varifocal lens assembly shown in FIGURES 1, 2 and 3.
Figure 5:
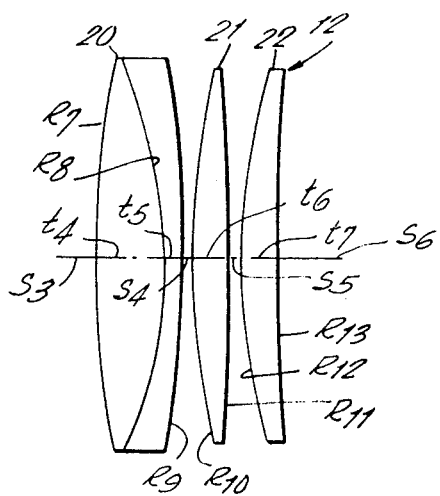
FIGURE 5 is a somewhat diagrammatic view in longitudinal section of the stationary lens group or erector of the varifocal lens assembly shown in FIGURES 1, 2 and 3.
Figure 6:
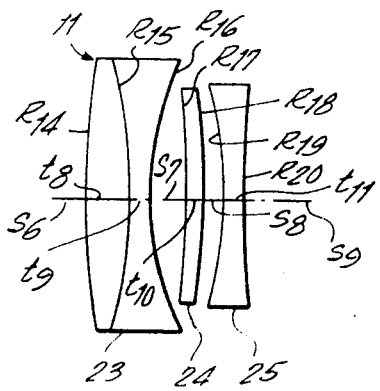
FIGURE 6 is a somewhat diagrammatic view in longitudinal section of the second movable lens group or compensator of the varifocal lens assembly according to the present invention.
Figure 7:
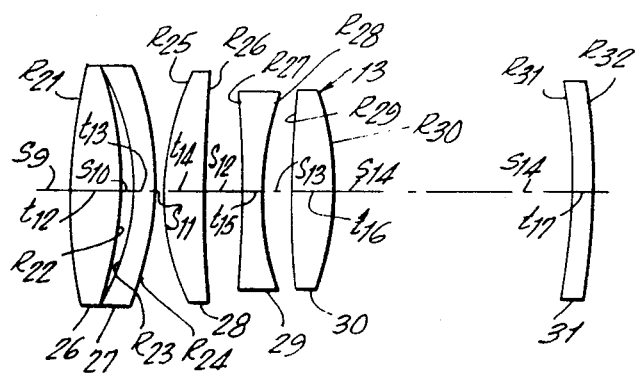
FIGURE 7 is a somewhat diagrammatic view in longitudinal section of the relay of the varifocal lens assembly according to the present invention.

Referring to the figures it will be seen that that varifocal lens system consists of a first movable lens group 10 indicated by the bracket in FIGURE 3, as the variator, a second movable lens group 11 indicated by the bracket as the compensator and a stationary lens group 12 between the variator and a compensator indicated by the bracket as the erector. The variator 10 and compensator 11 are linked together and axially slidable for zooming in accordance with well-known optically compensated varifocal structures.

A relay 13 follows the variator 10, erector 12 and compensator 11 and is separated therefrom by the iris 14.

In order to keep the physical dimensions of the varifocal lens system small, the front lens which has heretofore been used by lens designers has been omitted and the two movable lens groups 10, 11, have been made of negative power. The stationary erector 12 has positive power. While this arrangement is well known in the varifocal art, in the embodiment shown in the drawings, the variator 10 has a power of minus 20.4 diopters, the erector 12 has a power of plus 34.3 diopters and the compensator 11 a power of minus 55.3 diopters. Since such a system produces an upright virtual image, the relay 13 has, of necessity, a positive power.

In eliminating the front lens, a powerful tool for correcting the lens system has been lost. However, since the number of elements which make up the several lens groups within the varifocal lens must be limited in size and number in order to keep the overall physical dimensions of the system small, the said several lens elements must have considerable negative and positive power.

In order to achieve aberrational correction of the system, highly refractive glasses, with one exception, have been employed. The index of refraction of the glasses used is greater than 1.6. Although at the present time, many of the rare earth and highly refractive glasses are available, they have not been melted in sufficient variety as far as dispersion is concerned to allow chromatic correction, particularly in varifocal systems. Therefore, two cemented elements have a radii of practically zero power for D-light (sodium) and different dispersion (Abbe) numbers have been employed to keep longitudinal and lateral colors within photographically aceptable limits.

In modern lens computation using high speed digital computers, the shape of the lens is determined more or less automatically by use of iterative methods recently developed. In order to apply these methods successfully, it is imperative that the power of the several elements in a lens be distributed in a specific way. If they are not, the computer will go on iterating without ever reaching the target value. In the present invention, this requirement becomes even more important because one cannot apply the usual method; namely, adding another element in view of the size and space limitations.

Referring to the drawings the first lens group comprising the variator 10 consists of three negative menisci 17, 18, 19, convex towards the incoming light ray. The first meniscus 17 has a power of more than one-third but less than two-thirds of the total power of the variator group 10. The second meniscus 18 has a power more than one-fourth but less than one-half the power of the variator group 10. The power of the third meniscus 19 lies between one-eighth and three-eighths of the total power of the variator lens group 10. These conditions written as inequalities are:

$$\tfrac{1}{3}\Phi\ 10 < \phi\ 17 < \tfrac{2}{3}\Phi\ 10$$
$$\tfrac{1}{4}\Phi\ 10 < \phi\ 18 < \tfrac{1}{2}\Phi\ 10$$
$$\tfrac{1}{8}\Phi\ 10 < \phi\ 19 < \tfrac{3}{8}\Phi\ 10$$

Where the symbol $\Phi$=lens group and $\phi$=lens element.

The movable variator 10 is followed by a stationary positive erector 12 consisting of a cemented doublet 20 followed by a bi-convex lens 21 and meniscus shaped single lens 22, the latter also convex toward the incoming light. As explained above, the cemented surface of the cemented doublet 20 has practically zero power for yellow light and therefore the cemented doublet may be considered as a bi-convex singlet. The cemented doublet is formed of glass having different dispersion numbers as hereinafter set forth to correct chromatic aberration throughout the zoom. The three elements 20, 21, 22, each have substantially similar powers; that is, more than one-fourth but less than one-half the power of the total erector 12. These conditions written as inequalities are as follows:

$$\tfrac{1}{4}\Phi\ 12 < \phi\ 20 < \tfrac{1}{2}\Phi\ 12$$
$$\tfrac{1}{4}\Phi\ 12 < \phi\ 21 < \tfrac{1}{2}\Phi\ 12$$
$$\tfrac{1}{4}\Phi\ 12 < \phi\ 22 < \tfrac{1}{2}\Phi\ 12$$

The compensator 11 also consists of three elements 23, 24, 25, the first of which is a cemented doublet. The cemented radius R15 of the element 23 serves only for color correction. The color correction here, again, is achieved by the use of glass having different dispersion numbers. This cemented lens can be considered as a negative meniscus convex towards the incoming light. The power of the meniscus 23 lies between one-fourth and one-half of the negative power of the entire compensator 11. The negative meniscus 23 is followed by a weak meniscus 24, concave toward the incoming light, whose power is more than one-sixteenth but less than one-fourth the power of the total compensator 11. The last element 25 of the compensator is a bi-concave lens with a strong surface toward the incoming light and a very weak, nearly plane, rear surface. The last element 25 has a power of more than one-third but less than two-thirds the power of the total compensator 11, or:

$$\tfrac{1}{4}\Phi\ 11 < \phi\ 23 < \tfrac{1}{2}\Phi\ 11$$
$$\tfrac{1}{16}\Phi\ 11 < \phi\ 24 < \tfrac{1}{4}\Phi\ 11$$
$$\tfrac{1}{3}\Phi\ 11 < \phi\ 25 < \tfrac{2}{3}\Phi\ 11$$

The stationary aperture stop 14 is positioned behind the last element 25 of the compensator 11. The relay 13 is located behind the stop 14 and consists of six alternately positive and negative lenses 26, 27, 28, 29, 30 and 31. The first lens 26 of the relay, a bi-convex positive element, has a power of more than three-quarters but less than one and one-fourth the power of the relay 13, or: $\tfrac{3}{4}\Phi\ 15 < \phi\ 26 < 1\tfrac{1}{4}\Phi\ \tfrac{1}{3}$ The second component 27 of the relay is a negative meniscus concave toward the incoming light and with a power of more than one-quarter but less than one-half of the absolute total power of the relay 13, or:

$$[\tfrac{1}{4}\Phi\ 13] < \phi\ 27 < [\tfrac{1}{2}\Phi\ 13]$$

The third element 28 of the relay is a positive meniscus, convex toward the incoming light with a power of more than five-eighths but less than seven eighths of the total power of the relay 13, or: $\tfrac{5}{8}\Phi\ 13 < \phi\ 28 < \tfrac{7}{8}\Phi\ 13$ The fourth element 29 of the relay is a bi-concave lens with a weak surface toward the incoming light and a strong surface toward the image plane. The element 29 has a power at least equal to but not more than one and one-half times the absolute power of the whole relay 13, or: $[\Phi\ 13] < \phi\ 29 < [1\tfrac{1}{2}\Phi\ 13]$ The lens element 29 is in turn followed by a bi-convex positive element 30 having a weak surface toward the object side and a strong surface toward the image. The bi-convex positive element 30 has a power of more than three-quarters but less than one and one-fourth the total power of the relay 13, or:

$$\tfrac{3}{4}\Phi\ 13 < \phi\ 30 < 1\tfrac{1}{4}\Phi\ 13$$

The last component 31 of the relay is spaced at a relatively large distance from the element 30. The last element 31 is a negative meniscus, concave toward the object side and with a relatively weak power of more than one-eighth but less than three-eights of the absolute power of the total relay, or:

$$[\tfrac{1}{8}\Phi\ 13] < \phi\ 31 < [\tfrac{3}{8}\Phi\ 13]$$

The total system has a focal range of from 50.06 mm. to 121.63 mm. and a back focal length of 52.00 mm.

The following table gives the optical characteristics of a varifocal lens system as described above:

| Lens No. | Radius (R) mm. | Thickness (t) Air Spacing (s) | Class Cat. Ref. | Index ND | Dispersion, $\nu$ |
|---|---|---|---|---|---|
| 17 | 716.00 | $t_1 = 2.50$ | LaF-2 | 1.744 | 44.90 |
|    | 78.13  | $s_1 = 3.50$ |       |       |       |
| 18 | 379.87 | $t_2 = 2.50$ | LaF-2 | 1.744 | 44.90 |
|    | 89.00  | $s_2 = 3.50$ |       |       |       |
| 19 | 464.40 | $t_3 = 2.50$ | LaF-2 | 1.744 | 44.90 |
|    | 118.02 | $s_3 = 1.73$ to $16.13$ |   |       |       |

| ERECTOR | | | | | |
|---|---|---|---|---|---|
| 20 | 103.38 | $t_4 = 7.00$ | LaK-10 | 1.720 | 50.31 |
|    | −41.56 |              |        |       |       |
|    | −140.22 | $t_5 = 1.50$ | SF-18 | 1.7215 | 29.28 |
|    |        | $s_4 = .25$ |        |       |       |
| 21 | 63.58  | $t_6 = 4.00$ | LaK-9 | 1.691 | 54.79 |
|    | −258.75 | $s_5 = .25$ |        |       |       |
| 22 | 54.03  | $t_7 = 4.20$ | LaK-9 | 1.691 | 54.79 |
|    | 270.16 | $s_6 = 15.29$ to $.89$ |   |       |       |

See footnotes at end of table.

COMPENSATOR

| Lens No. | Radius (R) mm. | Thickness (t) Air Spacing (s) | Glass Cat. Ref. | Index ND | Dispersion, ν |
|---|---|---|---|---|---|
| 23 | 86.41 | $t_8 = 4.50$ | SF-18 | 1.7215 | 29.28 |
|    | −35.64 | $t_9 = 1.50$ | LaK-10 | 1.7200 | 50.31 |
|    | 26.30 | $s_7 = 3.40$ | | | |
| 24 | −96.74 | $t_{10} = 1.60$ | LaSF-1 | 1.8028 | 46.75 |
|    | −1,137.40 | $s_8 = 1.90$ | | | |
| 25 | −32.22 | $t_{11} = 1.60$ | | | |
|    | 552.18 | $s_9 = 1.00$ to 15.40 | | | |
| Iris | | $s_9 = 1.00$ | | | |

RELAY

| Lens No. | Radius (R) mm. | Thickness (t) Air Spacing (s) | Glass Cat. Ref. | Index ND | Dispersion, ν |
|---|---|---|---|---|---|
| 26 | +40.94 | $t_{12} = 5.00$ | BK-7 | 1.5168 | 64.19 |
|    | −35.64 | $s_{10} = 1.40$ | | | |
|    | −20.63 | | | | |
| 27 | −30.30 | $t_{13} = 2.00$ | SF-18 | 1.7215 | 29.28 |
|    | +24.07 | $s_{11} = .50$ | | | |
| 28 | +210.40 | $t_{14} = 4.50$ | SF-16 | 1.6204 | 60.29 |
|    | −171.72 | $s_{12} = 3.10$ | | | |
| 29 | +20.98 | $t_{15} = 2.00$ | LaK-10 | 1.7200 | 50.31 |
|    | +111.76 | $s_{13} = 3.00$ | | | |
| 30 | −25.00 | $t_{16} = 4.50$ | SK-16 | 1.6204 | 60.29 |
|    | −64.44 | $s_{14} = 13.50$ | | | |
| 31 | −210.40 | $t_{17} = 3.60$ | SF-18 | 1.7215 | 29.28 |

EFL = 50.06–121.63.
BFL = 52.00.
Movement = 14.40. Measurements in mm.
LaF = Lanthanum Flint.
LaK = Lanthanum Crown.
SF = Dense Flint.
LaSF = Dense Lanthanum Flint.
BK = Borosilicate Crown.
SK = Dense Crown.

Figure 1:
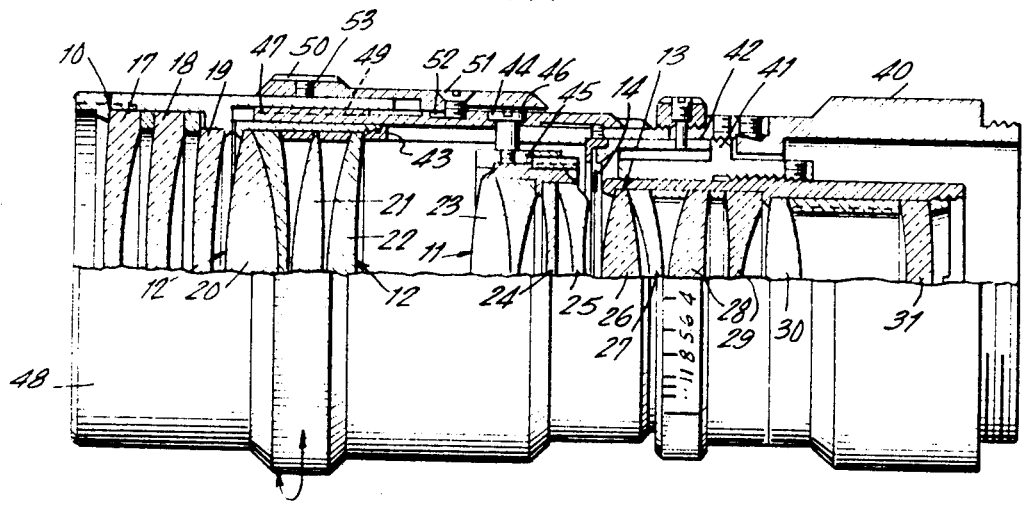
FIGURE 1 is a view in side elevation partly cut away of a complete varifocal lens made in accordance with the present invention with the movable lens elements in the rear or telephoto position.
Figure 2:
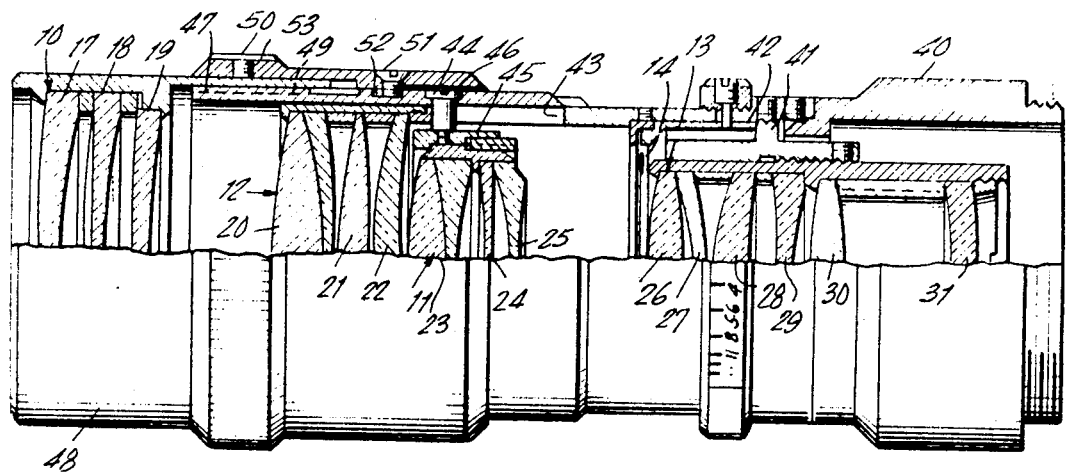
FIGURE 2 is a view similar to FIGURE 1 with the lens elements in the forward or wide angle position.

Referring again to FIGURES 1 and 2, it will be seen that the varifocal lens system is secured to the camera (not shown) by means of an adaptor 40. A first barrel 41 is carried within the adaptor 40 and serves to retain the relay assembly 13 therein. A main barrel 42 is secured to the front of the adaptor 41 and has mounted at the front thereof the erector lens system 12. The main barrel 42 is provided with an elongated slot 43 through which a stud 44 extends. The stud 44 is secured to a ring 45 within which the compensator lens assembly 11 is mounted. The stud 44 is held within a bore 46 in the zoom control barrel 47. The zoom control barrel 47 is slidably carried upon the main barrel 42 and can move longitudinally and telescopically upon the barrel 42 within the limits of the slot 43. The variator lens assembly 10 is held within a rotatable barrel 48 threadably carried upon the zoom control barrel 47 as indicated at 49 in FIGURES 1 and 2.

A knurled ring 50 is mounted upon the lens system and overlies the barrels 47, 48. The knurled ring 50 has a screw member 51 extending inwardly thereof and engaging a slot 52 in the zoom control barrel. A second screw 53 secures the ring 50 to the variator barrel 48. It will be apparent that by reason of the screws 52, 53, the variator barrel 48 will move longitudinally with the zoom control barrel 47. However, if the ring 50 is rotated the variator assembly 10 will be caused to move axially and independent of the rest of the lens system by the threads 49, thereby permitting focusing of the said system. By reason of the construction of the lens barrel and other members as hereinabove set forth, it is possible by grasping the ring 50 to move the movable lens systems for zooming purposes and rotate the variator for focusing purposes without removing one's hand from the lens assembly.

Having thus fully described the invention, what is claimed as new and desired to be secured by Letters Patent of the United States, is:

1. A varifocal lens assembly for use with still cameras comprising a tubular adaptor, a first barrel secured to and carried within the adaptor, a relay lens assembly supported by the first barrel, a main barrel secured to the front of the adaptor, an erector lens system carried within and spaced from the front of the main barrel, an elongated longitudinal slot in the main barrel, a ring member freely carried within the main barrel behind the erector lens assembly, a stud secured to the ring and extending outwardly thereof through the said slot, a compensator lens assembly within the ring, a zoom control barrel slidably carried upon the main barrel, a bore in the zoom control barrel to receive the stud, a thread in the outer surface of the zoom control barrel, a rotatable barrel overlying the said thread and extending forward of the main barrel and zoom control barrel, an internal thread on the rotatable barrel and extending inwardly thereof into the zoom barrel thread, and a variator lens assembly carried by the rotatable barrel in front of the erector lens system whereby longitudinal motion imparted to the rotatable barrel will shift the varifocal lens element for zoom purposes and rotary motion of the rotatable barrel will move the variator for focusing the varifocal lens assembly.

References Cited
UNITED STATES PATENTS 2,732,763   1/1956   Back et al. _____ 350—187
3,259,013   7/1966   Back _____ 350—184

DAVID SCHONBERG, Primary Examiner

PAUL R. GILLIAM, Assistant Examiner

U.S. Cl. X.R.

350—44